United States Patent Office 3,261,867
Patented July 19, 1966

3,261,867
2 - AMINO - 5 - HALO - 2' - DIALKYLAMINO - AND-PIPERIDINO-BENZOPHENONES AND PREPARATION THEREOF
Rodney Ian Fryer, West Orange, and Leo Henryk Sternbach, Upper Montclair, N.J., assignors to Hoffmann-La Roche Inc., Nutley, N.J., a corporation of New Jersey
No Drawing. Filed Nov. 13, 1962, Ser. No. 237,347
4 Claims. (Cl. 260—570)

Substituted ortho-aminobenzophenones have recently achieved importance as intermediates useful in the preparation of therapeutically valuable 5-phenyl-1,4-benzodiazepine 4-oxides and 5-phenyl-1,4-benzodiazepin-2-ones; and methods for obtaining said heterocyclic compounds from said ketones have been published, for example, the ketone can be converted to its corresponding oxime which latter compound can then be reacted with a α-halo-acyl halide to produce the corresponding ortho-(α-halo-acylamino)-benzophenone oxime, which then can be dehydrated to the corresponding 2-halomethyl-4-phenyl quinazoline 3-oxide, which latter compound, upon treatment with ammonia or a primary amine, rearranges to a 2-amino-5-phenyl-1,4-benzodiazepine 4-oxide. In another method, 5-phenyl-1,4-benzodiazepin-2-ones can be prepared from ortho-aminobenzophenones by, for example, condensation of the ketone with ethyl glycinate.

It has been found that 5-phenyl-1,4-benzodiazepin 4-oxides and 5-phenyl-1,4-benzodiazepin-2-ones of particularly valuable therapeutic properties are obtained when there is present an ortho or para substituent on the 5-phenyl ring. However, compounds bearing certain substituents on the 5-phenyl ring have, up to now, been obtainable only in a circuitous manner or, with respect to certain substituents, not at all.

The present invention provides a method for obtaining ortho-amino-benzophenous bearing in the 2'- or 4'-position, a substituent selected from the group consisting of nitro, cyano, tertiary amino, lower alkoxy and lower alkylthio. By the present invention, these compounds are obtained from readily available 2-amino-2' or 4'-fluorobenzophenones. Certain of the compounds prepared by the methods of this invention are novel and such compounds also form a part of this invention. By utilization of the 2' and 4' - substituted benzophenones obtained by this invention in known processes, therapeutically useful 5-(2 or 4-substituted-phenyl)-1,4-benzodiazepins can be obtained.

Thus, in one embodiment, the present invention comprises reacting a compound selected from the group consisting of ortho-fluorobenzophenones and para-fluorobenzophenones with a compound selected from the group consisting of ammonia, di-lower alkylamine, lower alkyleneimine, aralykylamine, alkali metal lower alkoxide, alkali metal lower mercaptide and heavy metal lower mercaptide.

The present invention makes available ortho-aminobenzophenones bearing in the 2' or 4'-position a nitro, cyano, tertiary amino, lower alkoxy or lower alkylthio substituent by two general approaches. The first of these comprises reacting an ortho-amino-2'- or 4'-fluorobenzophenone with a reactant which displaces the fluorine atom with one of the aforesaid substituents. Thus, one embodiment of the invention comprises the process for the preparation of compounds of the formula:

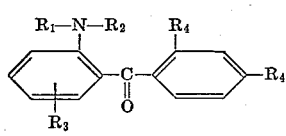

wherein $R_1$ is selected from the group consisting of hydrogen and lower alkyl; $R_2$ is selected from the group consisting of hydrogen and tosyl; $R_3$ is selected from the group consisting of hydrogen and middle halogen; one $R_4$ is hydrogen and the other is selected from the group consisting of di-lower alkylamino, lower alkyleneimino, lower alkylthio and lower alkoxy which comprises reacting a compound of the formula:

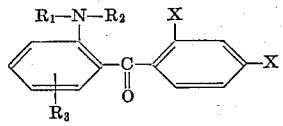

wherein one X is fluoro and the other is hydrogen, and $R_1$, $R_2$ and $R_3$ have the same meaning as above, with a compound selected from the group consisting of di-lower alkylamine, lower alkyleneimine, alkali metal lower alkoxide, alkali metal lower mercaptide and heavy metal lower mercaptide.

In a second approach of this invention an ortho-fluorobenzophenone containing the desired substituent on the non-fluorinated phenyl ring is reacted with a compound which displaces the fluorine and supplies an amino group in lieu thereof, for example, ammonia, a lower alkylamine or an aralkylamine, such as a phenyl-lower alkylamine as benzylamine. When an aralkylamine is utilized, the so-obtained compound can be subsequently dearalkylated. Thus, one embodiment of the invention comprises a process for the preparation of 2-amino-2' or 4'-R-benzophenone, wherein R is selected from the group consisting of cyano and nitro, which comprises reacting 2-fluoro-2' or 4'-R-benzophenone with a compound selected from the group consisting of ammonia, lower alkylamine and aralkylamine.

As used in this disclosure, the term lower alkyl comprehends both straight and branched chain saturated hydrocarbon groups such as methyl, ethyl, propyl, isopropyl and the like. The term middle halogen comprehends the middle halogens, viz. bromine and chlorine. The term lower alkylene comprehends saturated hydrocarbon groups such as pentylene and the like. The lower alkyl and lower alkylene groups in di-lower alkylamino, lower alkyleneimino, lower alkylthio and lower alkoxy are of the same character. Thus, di-lower alkylamino comprehends groups such as dimethylamino, lower alkyleneimino comprehends groups such as piperidino, lower alkylthio comprehends groups such as methylthio, and lower alkoxy comprehends groups such as methoxy. Alkali metal comprehends the alkali metals such as sodium, lithium potassium and the like. Heavy metal comprehends heavy metals which form stable salts with the mercaptide radical such as mercury, lead and the like.

The fluorine displacement of the present invention can be conducted utilizing the fluorine displacing reactant as the solvent or alternatively in the presence of an organic solvent, such as ethanol, ethoxy-ethanol, benzene, toluene, dimethylformamide, dimethylsulfoxide, or the like. Thus, for example, if the fluorine displacing agent is an aralkylamine such as benzylamine, a lower alkyleneimine, such as piperidine, or a di-lower alkylamine, the said reactant can also serve as the solvent medium. Alternatively, any of the aforesaid reactants can be reacted with the above described fluorobenzophenones in the presence of an organic solvent. When an alkali metal lower alkoxide or lower mercaptide is used as the fluorine displacement reactant, such can, for example, be formed in situ. The alkali metal can be added to a lower alkanol such as methanol thereby forming a solution of sodium methoxide in methanol, which is then used to treat the fluorobenzophenones, thus obtaining displacement of the fluorine substituent by a methoxy group.

When an alkali metal compound is used as a fluorine displacing reactant, the intermediate formed can be alkylated on the ortho-amino group without isolation. Thus, in this aspect of the invention a 2-amino-2' or 4'-fluorobenzophenone can be converted into a 2-lower alkylamino-2'- or 4'-lower alkoxybenzophenone via tosylation of the starting material aminofluorobenzophenone so as to yield a 2-tosylamino-2' or 4'-fluorobenzophenone which upon treatment with an alkali metal lower alkoxide will simultaneously undergo displacement of the fluorine and replacement thereof by a lower alkoxy group and formation of an alkali metal salt of the 2-tosylamino-2'- or 4'-lower alkoxy benzophenone thus formed. Treatment of this compound with a conventional alkylating agent will then yield a 2-(N-lower alkyl-N-tosyl)-amino-2' or 4'-lower alkoxy-benzophenone which can be detosylated by conventional means, for example, by treatment with concentrated sulfuric acid. However, such a detosylation treatment will then result in a sulfonation of the lower alkoxysubstituted ring and the soformed sulfo group must be removed by conventional desulfonation methods, for example, by refluxing in 50% sulfuric acid/water.

Accordingly, a particular embodiment of the present invention comprises a process for the preparation of 2-lower alkylamino-5-R-2'- or 4'-lower alkoxy benzophenone, which comprises reacting 2-tosylamino-5-R-2'- or 4'-fluorobenzophenone, wherein R is selected from the group consisting of hydrogen and middle halogen, with an alkali metal lower alkoxide and then with an alkylating agent selected from the group consisting of lower alkyl-halide and di-lower alkylsulfate.

Temperature is not critical to the fluorine displacement reaction of the present invention. For example, it can be conducted at room temperature. However, it has been found that elevated temperatures increase the rate of the reaction. Similarly, pressure is not critical and the reaction can be conducted at atmospheric pressure. However, pressures greater than atmospheric have been found to increase the rate of the reaction. Naturally, neither the temperature nor the pressure should be so high as to cause decomposition of the starting materials and/or products.

Concentration of the reactants is not critical. Suitably, the fluorine displacing reactant is used in at least stoichiometric amounts. Advantageously, an excess of the fluorine displacing reactant is used.

The following examples are illustrative but not limitative of the invention. All temperatures are stated in degrees centigrade.

*Example 1*

A solution of 2-amino-2'-fluorobenzophenone (1.4 mmoles) and sodium methoxide in methanol (20 ml. of a solution containing 4.44 mmoles/ml.) in toluene (50 ml.) was refluxed for two hours. The solvents were removed under reduced pressure and the residue partitioned between water (100 ml.) and methylene chloride (100 ml.). The organic layer was separated, washed with water (3 x 50 ml.), saturated brine solution 2 x 50 ml.), dried over anhydrous sodium sulfate, filtered and evaporated to dryness, yielding 2-amino-2'-methoxy-benzophenone as an oil which was crystallized from ethanol yielding pale yellow needles melting at 111–112°.

The above-mentioned starting material 2-amino-2'-fluorobenzophenone is not a part of this invention, but its preparation is set forth herein below in order that this disclosure may be complete.

A mixture of 176 g. of ortho-fluoro-benzoyl chloride and 64 g. of para-chloroaniline was stirred and heated to 180° C., at which temperature 87 g. of zinc chloride was introduced, the temperature raised to 200–205° and maintained there for forty minutes. The golden colored melt was quenched by the careful addition of 500 ml. of 3 N hydrochloric acid and the resulting mixture refluxed for five minutes. The acid solution was decanted and the process repeated three times to remove all orthofluorobenzoic acid. The grey granular residue was dissolved in 300 ml. of 75% (vol./vol.) sulphuric acid and refluxed for forty minutes to complete hydrolysis. The hot solution was poured over 1 kg. of ice and diluted to two liters with water. The organic material was extracted with four 300 ml. portions of methylene chloride which were subsequently washed with two 500 ml. portions of 3 N hydrochloric acid to remove traces of para-chloroaniline, three 500 ml. portions of 5 N sodium hydroxide solution to remove ortho-fluorobenzoic acid, and finally two 200 ml. portions of saturated brine solution. The methylene chloride extract was dried over anhydrous sodium sulphate and the solvent removed to give the crude aminobenzophenone. Recrystallization from methanol gave 2 - amino - 5 - chloro-2'-fluorobenzophenone yellow needls, (M.P. 94–95°).

50.0 g. of 2-amino-5-chloro-2'-fluorobenzophenone in 300 cc. of tetrahydrofuran was hydrogenated at atmospheric pressure in the presence of 10 g. of charcoal (Norite), 30.0 g. of potassium acetate and 2.5 cc. of a 20% palladous chloride solution (20% by weight of palladium). After an initiation period varying from ten minutes to an hour, hydrogen uptake was rapid and stopped completely after the absorption of the theoretical amount. Filtration of the catalyst over a "Hyflo" pad and removal of the solvent left a yellow crystalline residue. The crude mixture of ketone and potassium acetate was partitioned between methylene chloride (300 cc.) and water (1 l.). The layers were separated and the water layer washed with methylene chloride (3 x 50 cc.). The organic layers were combined, washed with 3 N sodium hydroxide solution (2 x 50 cc.), water (3 x 100 cc.), saturated brine solution (3 x 100 cc.), dried over anhydrous sodium sulfate and filtered. The solvent was removed and the product recrystallized from ethanol to give 2-amino-2'-fluorobenzophenone as yellow prisms melting at 126–8°.

*Example 2*

A solution of 2-tosylamino-2'-fluorobenzophenone (12 mmoles) in toluene (50 ml.) was refluxed with a methanolic solution of sodium methoxide (25 ml. of a solution containing 4.44 mmoles of sodium methoxide/ml.) for two hours. The solvents were evaporated under reduced pressure and the residue partitioned between water (100 ml.) and methylene chloride (100 ml.). The organic layer was separated, washed with water (3 x 50 ml.), saturated brine solution (2 x 50 ml.), dried over anhydrous sodium sulfate, filtered and evaporated to dryness. The residual oil was crystallized from ethanol, yielding 2-tosylamino-2'-methoxy-benzophenone as white prisms melting at 134–135°.

By the above procedure, the following compounds were prepared from corresponding 2-tosylamino-2'-fluorobenzophenone:

2-tosylamino-5-bromo-2'-methoxy - benzophenone, which formed white needles melting at 114–115°.

2-tosylamino-5-chloro-4'-methoxy - benzophenone, which formed white needles melting at 128–130°.

The above-mentioned 2-tosylamino-2'-fluorobenzophenone starting materials are not a part of this invention, but their preparation is set forth hereinbelow in order that this disclosure may be complete.

A mixture of 2-amino-2'-fluorobenzophenone (3 g.) and p-toluenesulfonyl chloride (3.2 g.) was dissolved in pyridine (15 cc.) and refluxed for ninety minutes. A total of two-thirds of the pyridine was removed by distillation and the residue poured into water (500 cc.). The mixture was stirred until the product had solidified, and then filtered. The precipitate was dissolved in methylene chloride (50 cc.), and the resulting solution washed with 2 N hydrochloric acid (3 x 25 cc.), water (3 x 25 cc.), saturated brine solution (2 x 50 cc.), dried over anhydrous sodium sulfate treated with Norite and filtered. Removal of the solvent and crystallization of the residue from ethanol gave 2-p-toluenesulfonamido-2'-fluorobenzophenone as white needles melting at 129.5–130°.

The procedure used in the following preparation was essentially that used for 2-amino-2'-fluorobenzophenone described in Example 1 above. Reaction times and temperatures were varied as were hydrolysis conditions.

To a mixture of 580 g. of o-fluorobenzoyl chloride and 265 g. of p-bromoaniline at 180°, 262 g. of zinc chloride was added with stirring. The temperature was raised to 195–205° and maintained there for two hours. The reaction mixture was quenched and washed with acid as in the previous example, and the residue was hydrolyzed for twenty hours with 1 liter of 60% (v./v.) sulphuric acid. The product, 2-amino-5-bromo-2'-fluorobenzophenone, was extracted as before, yielding yellow needles, M.P. 101–2°.

A mixture of 50 g. of 2-amino-5-bromo-2'-fluorobenzophenone and 38.8 g. of p-toluenesulfonyl chloride was refluxed in 200 ml. of pyridine for 90 minutes. The pyridine was then distilled off until the volume was reduced to 100 ml., the residue poured into 250 ml. of water and stirred. The resulting precipitate was filtered off and washed with 600 ml. of hot water followed by 300 ml. of petroleum solvent (B. 30–40°). The resulting product was crystallized from methanol to give 2-p-toluenesulfonamido - 5 - bromo-2'-fluorobenzophenone as white prisms melting at 114–115°.

p-Fluorobenzoyl chloride (66 g.) was heated in a 2 l. three neck round bottom flask, fitted with a thermometer, condenser and stirrer, to 160° and p-chloroaniline (24 g.) was then added thereto. The temperature was raised to 200° and zinc chloride (33 g.) was introduced. The temperature was maintained at 200–210° for one hour and then the reaction was quenched by the careful addition of 250 cc. of 3 N hydrochloric acid. The resulting mixture was refluxed for a few minutes and the acid portion decanted. The process of boiling with 250 cc. portions of 3 N hydrochloric acid was repeated three times. The residue was then hydrolyzed by refluxing in 500 cc. of concentrated hydrochloric acid for 17 hours. The mixture was cooled and made alkaline with 10 N sodium hydroxide, keeping the temperature below 30° by external cooling. The resulting yellow precipitate was filtered, dissolved in methylene chloride (300 cc.) and washed with 3 N hydrochloric acid (3 x 100 cc.). The organic layer was washed acid free with water (4 x 50 cc.), dried over anhydrous sodium sulfate, filtered and concentrated to an oil. The residue was dissolved in 2 l. of hexane, filtered, concentrated to 500 cc. and allowed to crystallize. The crystals were filtered to give yellow needles of 2-amino - 5 - chloro-4'-fluorobenzophenone melting at 108–9°.

A mixture of 2-amino-5-chloro-4'-fluorobenzophenone (3.0 g.) and p-toluenesulfonyl chloride (2.8 g.) in pyridine (15 cc.) was refluxed for 90 minutes. Two-thirds of pyridine was removed by distillation and the residue poured into 1 l. of water and stirred for one hour. The crystalline residue was filtered, dissolved in methylene chloride (150 cc.) and the solution washed with 3 N hydrochloric acid (2 x 25 cc.), water (3 x 50 cc.), saturated brine solution (2 x 50 cc.), dried over anhydrous sodium sulfate and filtered. Methylene chloride was removed and the residue recrystallized from methanol to give 2-p-toluenesulfonamido-5-chloro-4'-fluorobenzophenone as white prisms melting at 126–8°.

Example 3

A mixture of 2-tosylamino-5-chloro-2'-fluorobenzophenone (105.7 mmoles) and sodium methoxide (158.3 mmoles) in methanol (34. ml.) and toluene (100 ml.) was refluxed for 30 minutes. The reaction mixture was concentrated to 40 ml. by distillation, cooled and dimethyl sulfate added (158.5 mmoles). After an additional reflux period of ninety minutes, 3 N sodium hydroxide solution (100 ml.) was added and heating maintained for twenty minutes. The mixture was then cooled and the layers separated. The aqueous layer was washed with ether (2 x 50 ml.), the organic layers combined and washed alkali free with saturated brine (4 x 25 ml.). Removal of the solvent under reduced pressure gave an oil which soon crystallized. The product was recrystallized from ethanol, yielding 2-(N-methyl-N-tosylamino)-5-chloro-2'-methoxybenzophenone, as white needles melting at 150–151°.

Using the above procedure, the following compound was prepared from the corresponding tosylaminobenzophenone:

2 - (N - methyl-N-tosylamino)-5-bromo-2'-methoxybenzophenone, which formed white needles melting at 154–155°.

The above-mentioned 2-tosylamino-5-chloro-2'-fluorobenzophenone starting material is not a part of this invention, but its preparation is set forth hereinbelow in order that this disclosure may be complete.

A mixture of 23.5 g. of 2-amino-5-chloro-2'-fluorobenzophenone and 21.5 g. of p-toluenesulfonyl chloride was dissolved in 100 ml. of pyridine and refluxed for ninety minutes. After distillation of 50 ml. of pyridine, the residue was poured into 250 ml. of water and stirred until the oil had solidified (thirty minutes). The precipitate was filtered and washed with 600 ml. of hot water followed by 300 ml. of petrol (B.P. 30–40°). The residue was recrystallized from methanol to give 2-p-toluenesulfonamido-5-chloro-2'-fluorobenzophenone, yellow prisms M.P. 119–120°.

Example 4

A solution of 150 g. of 2-amino-5-chloro-2'-fluorobenzophenone in 500 ml. of benzene was refluxed for four hours with a solution of 54 g. of sodium methoxide in 230 ml. of methanol. The resulting solution was evaporated under reduced pressure to an oil which was dissolved in 500 ml. of ether, washed with water (3 x 200 ml.) and dried over sodium sulfate. Filtration of the solution over 150 g. of Woelm grade I neutral alumina and removal of the solvent gave an oil which was crystallized from an ether, hexane mixture yielding 2-amino-5-chloro-2'-methoxybenzophenone as bright yellow prisms melting at 81–83°.

Example 5

A standard solution of sodium methylmercaptan (96 ml. of a solution containing 200 mmoles of $NaSCH_3$) in 2-ethoxy ethanol was refluxed for three hours with 25 g. of 2-amino-5-chloro-2'-fluorobenzophenone. The solution was concentrated to approximately 30 ml. by distillation and the residue partitioned between methylene chloride (200 ml.) and water (200 ml.). The layers were separated, and the organic layer washed with 3 N hydrochloric acid (2 x 100 ml.), water (3 x 100 ml.), dried over anhydrous sodium sulfate, filtered and concentrated to an oil. A small portion of the so-obtained 2-amino-5-chloro-2'-methylthiobenzophenone was crystallized from hexane to give yellow plates, M.P. 100–100.5°.

Example 6

A mixture of 20 g. of 2-amino-5-chloro-2'-fluorobenzophenone, 71 ml. of an ethanolic solution of dimethylamine (400 mmoles) and 300 ml. of ethanol was heated in an autoclave at 110° for twenty-four hours. (Initial pressure 100 p.s.i. of $N_2$: max. pressure 210 p.s.i.) The cooled solution was concentrated to an oil under reduced pressure; dissolved in ether (300 ml.), washed with water (2 x 50 ml.) and extracted into 9 N hydrochloric acid (4 x 100 ml.). The acid extracts were combined, washed with ether (2 x 100 ml.) made basic with 10 N sodium hydroxide and the precipitated oil extracted into dichloromethane (3 x 100 ml.). The combined organic layers were washed with water (3 x 50 ml.), dried over sodium sulfate and concentrated yielding 2-amino-5-chloro-2'-dimethylaminobenzophenone as a bright yellow oil. An ether solution of the product was filtered over 50 g. of alumina, concentrated and slowly crystallized from a hexane-ether mixture yielding yellow prisms melting at 85-6°.

Example 7

A solution of 25 g. of 2-amino-5-chloro-2'-fluorobenzophenone in 100 ml. of piperidine was refluxed for twenty-four hours, and then evaporated under reduced pressure to an oil. The residue was then continuously extracted with boiling hexane until only a small amount of dark insoluble material remained. The hexane extracts were combined, treated with decolorizing charcoal, filtered, concentrated and cooled, yielding 2-amino-5-chloro-2'-piperidinobenzophenone as bright yellow prisms. Recrystallization of a small portion of the product from hexane yielded a purified sample melting at 110-114°.

Example 8

A mixture of 7.6 g. of 2-cyano-2'-fluorobenzophenone, and 6.7 g. of benzylamine in 70 ml. of dry toluene was refluxed for two hours and then concentrated, under reduced pressure, to a bright green oil. The oil was dissolved in 100 ml. of methylene chloride, washed with water (3 x 75 ml.), dried over anhydrous sodium sulfate, filtered and concentrated. Crystallization from ether gave 2-benzylamino-2'-cyanobenzophenone, as yellow rods, melting at 142-143.5°.

A mixture of 6.0 g. of 2-benzylamino-2'-cyanobenzophenone and 1.0 g. of 10% palladium on charcoal and 1.4 ml. of concentrated hydrochloric acid in 150 ml. of glacial acetic acid was reduced with hydrogen. The reaction was stopped after forty minutes, when 1.15 mmoles of hydrogen had been adsorbed, filtered, neutralized with ammonium hydroxide at 10-15° and extracted with methylene chloride (3 x 100 ml.). The organic layers were combined, washed with 100 ml. of 30% (w./w.) sodium carbonate solution, 3 x 75 ml. of water, dried over anhydrous sodium sulfate, and evaporated. The residue was crystallized from an acetone, hexane mixture to give 2-amino-2'-cyanobenzophenone, as yellow plates melting at 132-3°.

The above-mentioned 2-cyano-2'-fluorobenzophenone is not a part of this invention, but its preparation is set forth hereinbelow in order that this disclosure may be complete.

A solution of 10.0 g. of 2-amino-2'-fluorobenzophenone in 20 ml. of concentrated sulfuric acid was added slowly to a cooled solution of 4.0 g. of sodium nitrite in 40 ml. of concentrated sulfuric acid, keeping the temperature below 10°. The reaction mixture was stirred at room temperature for one hour, cooled in an ice bath and carefully neutralized with a 30% (w./w.) solution of sodium carbonate. The resulting solution of diazonium salt was then added over a period of thirty minutes to a vigorously stirred, ice cold mixture of 100 ml. of benzene and a solution of 6 g. of sodium cyanide, 4.5 g. of copper cyanide and 2.5 g. of sodium bicarbonate in 40 ml. of water. The mixture was stirred at room temperature for one hour, then for five minutes at 50°, cooled and the layers separated. The aqueous layer was extracted with 100 ml. of benzene. The organic layers were combined, washed with 100 ml. of water, 50 ml. of saturated brine and evaporated to a brown oil. The oil was dissolved in ether and filtered through 25 g. of Grade I neutral alumina. The solution was concentrated and crystallized from an ether, petroleum ether (B.P. 30-60) mixture to give 2-cyano-2'-fluorobenzophenone as pale yellow rods, melting at 73-4°.

Example 9

A solution of 12.0 g. of 2-nitro-2'-fluorobenzophenone in 400 ml. of ethanol saturated with ammonia was heated in an autoclave at 150° (initial ammonia pressure 100 p.s.i.g.) for 24 hours. Ethanol was removed under reduced pressure, the oil dissolved in 800 ml. of hot 6 N hydrochloric acid and filtered. The filtrate was made alkaline with ammonium hydroxide, and extracted with methylene chloride (2 x 100 ml.). The organic layer was washed with 100 ml. of water, 100 ml. of brine and dried over anhydrous sodium sulfate. The solvent was removed and the oil recrystallized from methanol giving 2-nitro-2'-aminobenzophenone as orange needles, M.P. 146-9°.

We claim:
1. A compound of the formula

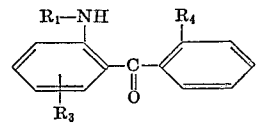

wherein $R_1$ is hydrogen, lower alkyl or phenyl-lower alkyl; $R_3$ is bromine or chlorine; and $R_4$ is di-lower alkylamino or piperidino.

2. 2-amino-5-chloro-2'-dimethylaminobenzophenone.

3. A process for the preparation of a compound of the formula

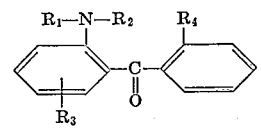

wherein $R_1$ is hydrogen or lower alkyl, $R_2$ is hydrogen or tosyl, $R_3$ is bromine or chlorine and $R_4$ is di-lower alkylamino or piperidino, which comprises reacting a compound of the formula

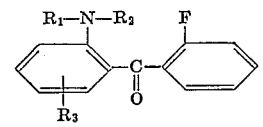

wherein $R_1$, $R_2$ and $R_3$ have the same meaning as above with a compound selected from the group consisting of di-lower alkylamine and piperidine.

4. A process which comprises reacting 2-amino-5-X-2'-fluorobenzophenone, wherein X is bromine or chlorine, with dimethylamine.

References Cited by the Examiner

UNITED STATES PATENTS

| | | | |
|---|---|---|---|
| 1,787,065 | 12/1930 | Calcott et al. | 260—570 |
| 1,946,058 | 2/1934 | Britton et al. | 260—570 |
| 2,231,067 | 2/1941 | Hammond et al. | 260—570 |
| 2,761,873 | 9/1956 | Gregory et al. | 260—516 |
| 2,893,992 | 7/1959 | Sternbach | 260—570 XR |

FOREIGN PATENTS 295,495  11/1916  Germany.

OTHER REFERENCES

Tanasescu et al., "Bull. Soc. Chim." (5) 3, pages 1753–61 (1936).

Dziewonski et al., "Chemical Abstracts," vol. 30, pages 2971-2 (1936).

CHARLES B. PARKER, Primary Examiner.

D. R. MAHANAND, R. V. HINES,
  Assistant Examiners.